United States Patent
Van Rotterdam et al.

(10) Patent No.: US 11,336,645 B2
(45) Date of Patent: May 17, 2022

(54) COMPUTING SYSTEM PROVIDING SAAS APPLICATION ACCESS WITH DIFFERENT CAPABILITIES BASED UPON USER PERSONAS

(71) Applicant: CITRIX SYSTEMS, INC., Fort Lauderdale, FL (US)

(72) Inventors: Jeroen Van Rotterdam, Fort Lauderdale, FL (US); Georgy Momchilov, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 310 days.

(21) Appl. No.: 16/156,256

(22) Filed: Oct. 10, 2018

(65) Prior Publication Data
US 2020/0120092 A1    Apr. 16, 2020

(51) Int. Cl.
*H04L 29/00*    (2006.01)
*H04L 29/06*    (2006.01)

(52) U.S. Cl.
CPC ........ *H04L 63/0876* (2013.01); *H04L 63/105* (2013.01)

(58) Field of Classification Search
CPC .......................... H04L 63/0876; H04L 63/105
USPC ............................................................ 726/7
See application file for complete search history.

(56) References Cited

U.S. PATENT DOCUMENTS

| | | | |
|---|---|---|---|
| 8,539,561 B2 | 9/2013 | Gupta et al. | |
| 9,176,744 B2 | 11/2015 | Lee | |
| 9,538,345 B2 | 1/2017 | Sah et al. | |
| 9,826,100 B2 * | 11/2017 | Hughes | H04M 15/00 |
| 2013/0298187 A1 | 11/2013 | Black et al. | |
| 2014/0344922 A1 | 11/2014 | Lam et al. | |
| 2016/0277387 A1 * | 9/2016 | DeWeese | G06F 21/10 |
| 2018/0027006 A1 * | 1/2018 | Zimmermann | G06F 9/46 726/11 |

\* cited by examiner

*Primary Examiner* — Jeffrey C Pwu
*Assistant Examiner* — Michael D Anderson
(74) *Attorney, Agent, or Firm* — Allen, Dyer, Doppelt + Gilchrist, PA

(57) ABSTRACT

A computing system may include at least one client computing device and a server configured to authenticate the at least one client computing device based upon a user account, with the user account having an enterprise persona and a private persona associated therewith. The server may be further configured to determine whether the enterprise persona or the private persona is active based upon a context associated with the at least one client computing device. When the enterprise persona is active, the server may provide access to a Software as a Service (SaaS) application with a first set of capabilities enabled, and when the private persona is active, the server may provide access to the SaaS application with a second set of capabilities enabled that is different than the first set of capabilities.

17 Claims, 7 Drawing Sheets

COMPUTING SYSTEM PROVIDING SAAS APPLICATION ACCESS WITH DIFFERENT CAPABILITIES BASED UPON USER PERSONAS

BACKGROUND

Traditionally, personal computers include combinations of operating systems, applications, and user settings, which are each managed individually by owners or administrators on an ongoing basis. However, many organizations are now using application and/or desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server(s) may include one or more hypervisors (virtual machine managers) to create and maintain multiple virtual machines, software to manage the hypervisor(s), a connection broker, and software to provision and manage the virtual desktops. In some embodiments, a VDI server(s) may provide access to shared server-based hosted applications, as well as Web/Software-as-a-Service (SaaS) applications.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, and/or provide access to shared applications, along with additional computing devices to provide management and customer portals for the cloud system.

SUMMARY

A computing system may include at least one client computing device and a server configured to authenticate the at least one client computing device based upon a user account, with the user account having an enterprise persona and a private persona associated therewith. The server may be further configured to determine whether the enterprise persona or the private persona is active based upon a context associated with the at least one client computing device. When the enterprise persona is active, the server may provide access to a Software as a Service (SaaS) application with a first set of capabilities enabled, and when the private persona is active, the server may provide access to the SaaS application with a second set of capabilities enabled that is different than the first set of capabilities.

In accordance with on example, the first and second sets of capabilities may be associated with different respective data loss prevention (DLP) access levels. Furthermore, the server may determine whether the enterprise persona or the private persona is active based upon a location of the client computing device, for example. Additionally, the first set of capabilities may include access to data from other user accounts, and the second set of capabilities may include access only to data from the user's respective account.

In one example implementation, the server may further determine whether the enterprise persona or the private persona is active based upon a type of data to be accessed by the at least one client computing device. Furthermore, in an example implementation the server may provide access to a first instance of the SaaS application with a first set of capabilities enabled for the enterprise persona, and provide access to a second instance of the SaaS application with the second set of capabilities enabled for the private persona. Furthermore, the server may also be configured to migrate between the first and second instances of the SaaS application while the at least one client computing device remains authenticated based upon a change in the context. In one example implementation, the first set of capabilities includes data recording, and the second set of capabilities does not include data recording.

A related method for using a server may include authenticating at least one client computing device based upon a user account, with the user account having an enterprise persona and a private persona associated therewith. The method may further include determining whether the enterprise persona or the private persona is active based upon a context associated with the at least one client computing device. When the enterprise persona is active, the server may provide access to a SaaS application with a first set of capabilities enabled, and when the private persona is active, access to the SaaS application with a second set of capabilities enabled that is different than the first set of capabilities.

A related non-transitory computer-readable medium may have computer-executable instructions for causing a server to perform steps including authenticating at least one client computing device based upon a user account, with the user account having an enterprise persona and a private persona associated therewith. The steps may further include determining whether the enterprise persona or the private persona is active based upon a context associated with the at least one client computing device, and when the enterprise persona is active, providing access to a Software as a Service (SaaS) application with a first set of capabilities enabled. When the private persona is active, access to the SaaS application may be provided with a second set of capabilities enabled that is different than the first set of capabilities.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
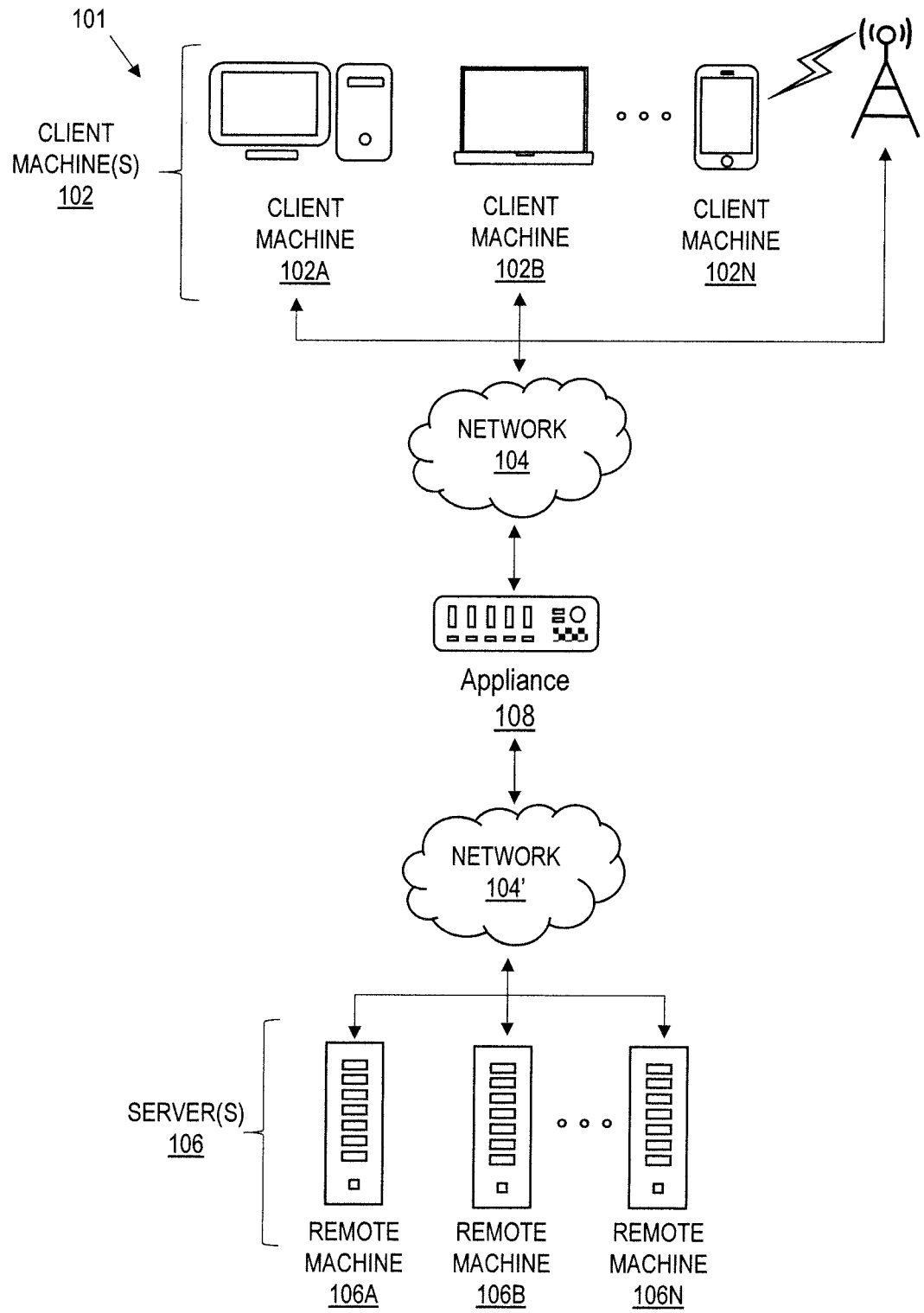
FIG. 1 is a schematic block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
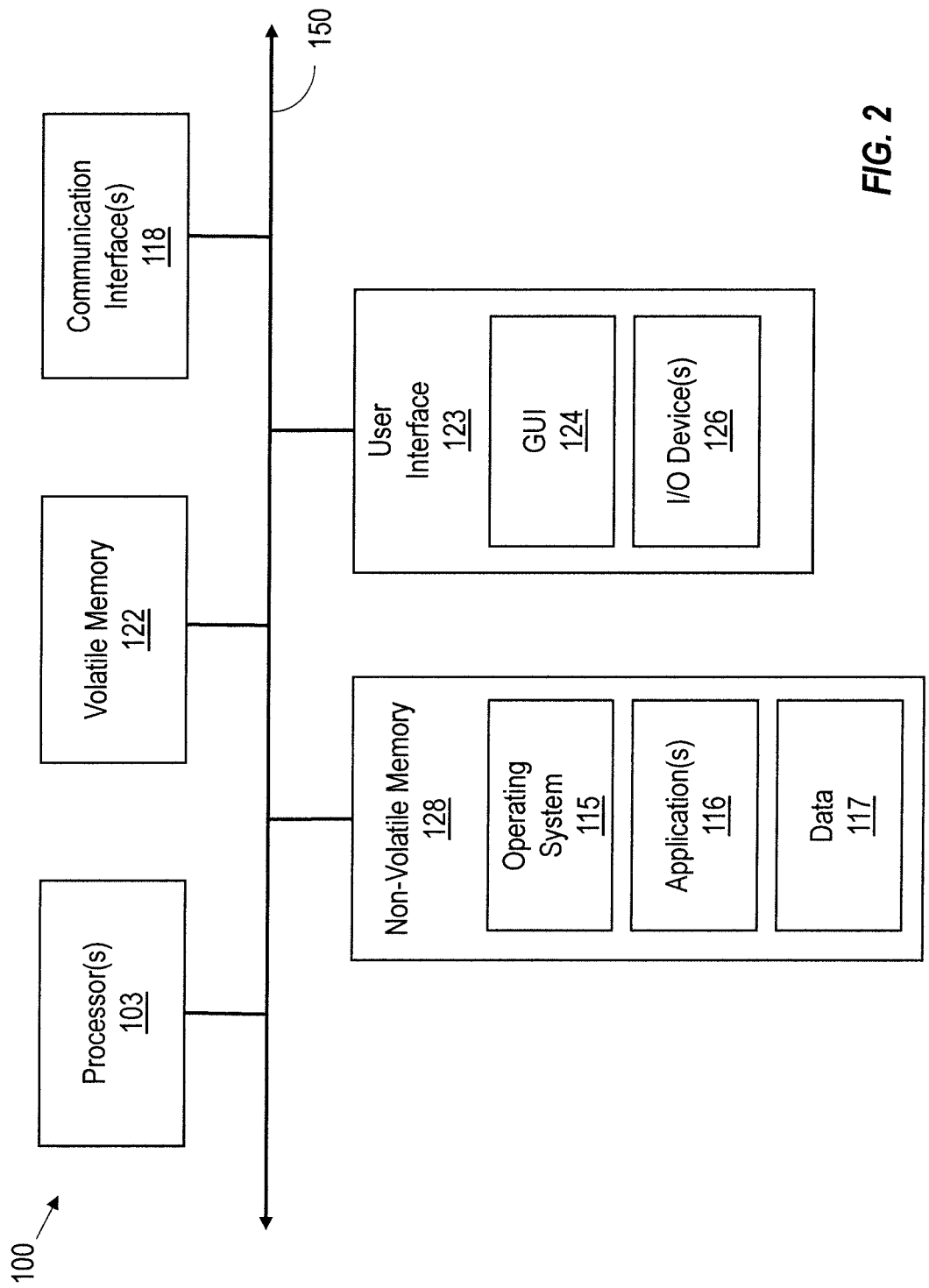
FIG. 2 is a schematic block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
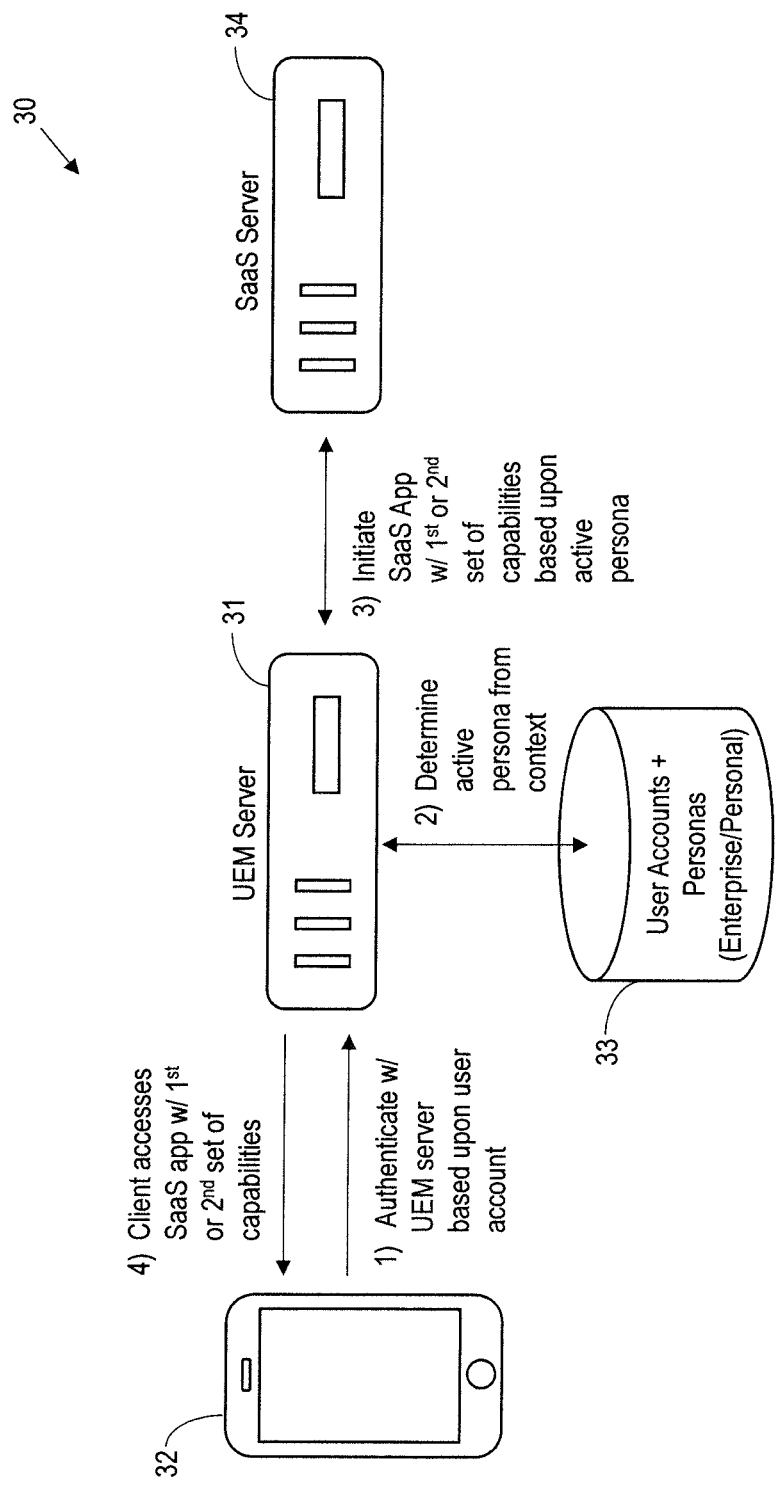
FIG. 3 is a schematic block diagram of a computing system in accordance with an example embodiment providing Software as a Service (SaaS) application access based upon different user personas.
Figure 4:
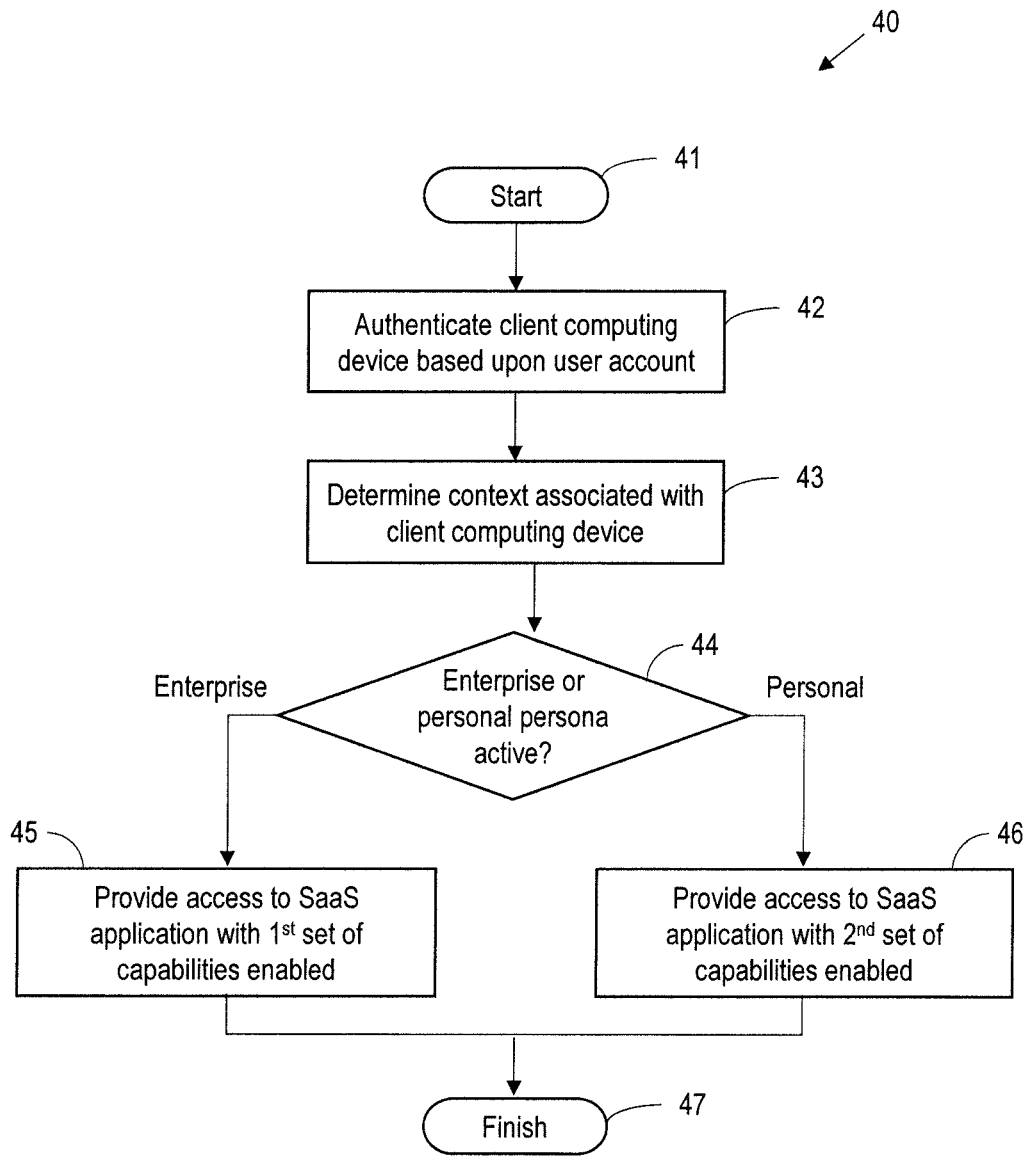
FIG. 4 is a flow diagram illustrating method aspects associated with the system of FIG. 3.

Turning now to FIG. 3 and the flow diagram 40 of FIG. 4, a computer system 30 and associated method aspects are first described. In the illustrated example, the computer system 30 is a unified endpoint management (UEM) implementation illustratively including one or more UEM servers or appliances 31 through which an enterprise may exercise centralized control of client computing devices 32. It should be noted that other configurations of the system 30 are also possible, such as an enterprise mobility management (EMM) configuration, for example.

In the illustrated example, the client computing device 32 is a smartphone, but the system 30 may work with numerous other types of client devices such as desktop computers, laptops, and tablet computers, for example. The server 31 allows for the enforcement of data loss prevention (DLP) and/or other security policies for user access to various applications and data, and in some instances may be implemented in conjunction with a mobile device management (MDM) agent installed on the client device 32. Also, the system 30 may utilize a mobile application management (MAM) approach, which provides enterprise control at the application level for managing and securing application data without installing an agent on the client computing device 32. In accordance with one example implementation, the UEM server 31 may be implemented as part of a Citrix Workspace implementation in combination with Citrix Netscaler Secure Web Gateway to provide SaaS application access as discussed further below, but it will be appreciated that other systems and platforms may be used in different embodiments.

By way of background, in several industries such as banking, end-users may have multiple personas. For example, bank employees may also be customers of the bank and therefore have both enterprise and personal personas, respectively. Regulatory requirements dictate that there be a separation between a user's ability to access his or her own account and the ability to access other user accounts in the capacity as a bank employee. Historically, enterprise software used by employees during work would be locally run and only accessible while the employee was at work. However, employees now routinely perform work tasks outside of the office on their personal devices in "bring your own device" (BYOD) environments. Even so, typical EMM approaches do not allow for straightforward separation of access to capabilities within SaaS applications and across SaaS applications based on different personas of a user. Generally speaking, such systems require a user to maintain multiple accounts for accessing the same SaaS application, and the user is required to log in and out of the different accounts based upon whether personal or enterprise access is required.

Beginning at Block 41, the server 31 may be configured to authenticate the client computing device 32 based upon a user account, with the user account having an enterprise persona and a private persona associated therewith. In the illustrated example, account and associated persona data may be stored in a database 33, which may be local or part of a cloud-based implementation. In an example embodiment, the user of the client computing device 32 may provide a username and password, biometric data, etc., which is associated with the respective user's account to authenticate the client computing device for use with the server 31, at Block 42.

The server 31 may be further configured to determine whether the enterprise persona or the private persona is active based upon a context associated with the client computing device 32, at Blocks 43-44. Again, one example of enterprise/personal personas would be the bank employee/bank customer example noted above, but the present approach may be applicable in other enterprise scenarios as well (e.g., government, corporate, etc.). In accordance with one example, the context may include a location of the client computing device 32, and accordingly the user. For example, in the case of a bank employee, if the client computing device 32 is at or in the bank (which may be determined by geolocation (e.g., GPS), WiFi access point, etc.), then the context may be considered indicative of the enterprise persona being active. A time and/or date may also be part of the context, such as if the client computing device is at the bank during working hours on a weekday (indicating the enterprise persona is active), or after hours or on a weekend (indicating the personal persona is active, such as if the user is stopping by to drop off a deposit, for example).

Similarly, one or more identities associated with the user may provide context as to which persona is active. For example, an identity as a bank teller vs. a bank IT personnel may provide context, in that the typical manner and/or times when these employees require enterprise access to the SaaS application may be different. In still another example, different client devices 32 may be associated with the user, and the context may include which client device 32 is being authenticated for use with the server 31 (e.g., a user's smartphone versus the user's desktop work computer).

Other indicators of the persona context may include the types of data to be accessed. For example, a general home screen for the SaaS application may initially be displayed at the client device upon authentication, but once the user requests access to a particular type of data then the appropriate persona may be determined based upon the data access request. For example, a request to access the account data for other bank customers would indicate the enterprise persona should be active, while a request to access the user's own bank account data would indicate that the personal persona should be active. In some example embodiments, a block JavaScript statement or Uniform Resource Identifier (URI) may be utilized as part of the authentication process to help identify the persona context. In applications where MAM/MDM architecture is employed, the MAM/MDM platform may be utilized to determine the persona context.

Once the server 31 determines whether the enterprise persona or the personal persona is active, access to a SaaS application from a SaaS server 34 may then be provided based upon a corresponding set of capabilities appropriate for the active persona. That is, when the enterprise persona is active, the server 31 may provide access to the SaaS application with a first set of capabilities enabled, at Block 45, and when the private persona is active, the server 31 may provide access to the SaaS application with a second set of capabilities enabled that is different than the first set of capabilities, at Block 46. The method of FIG. 4 illustratively concludes at Block 47.

Figure 7:
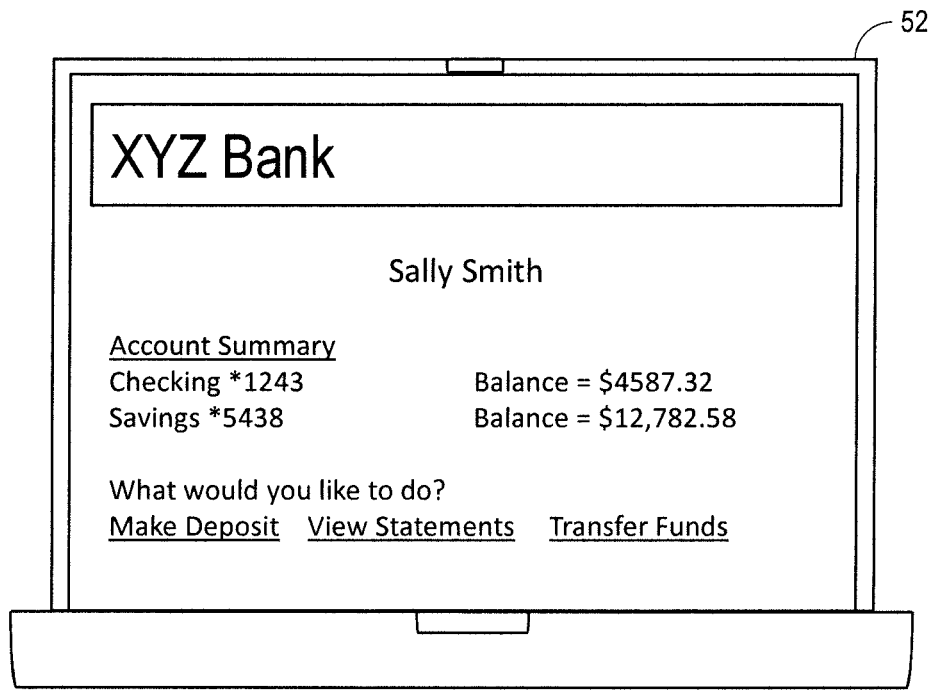
FIGS. 7 and 8 are schematic diagrams of a client computing device for use with the systems of FIG. 3 or 5 providing access to a SaaS banking application based upon personal and enterprise personas, respectively.
Figure 8:
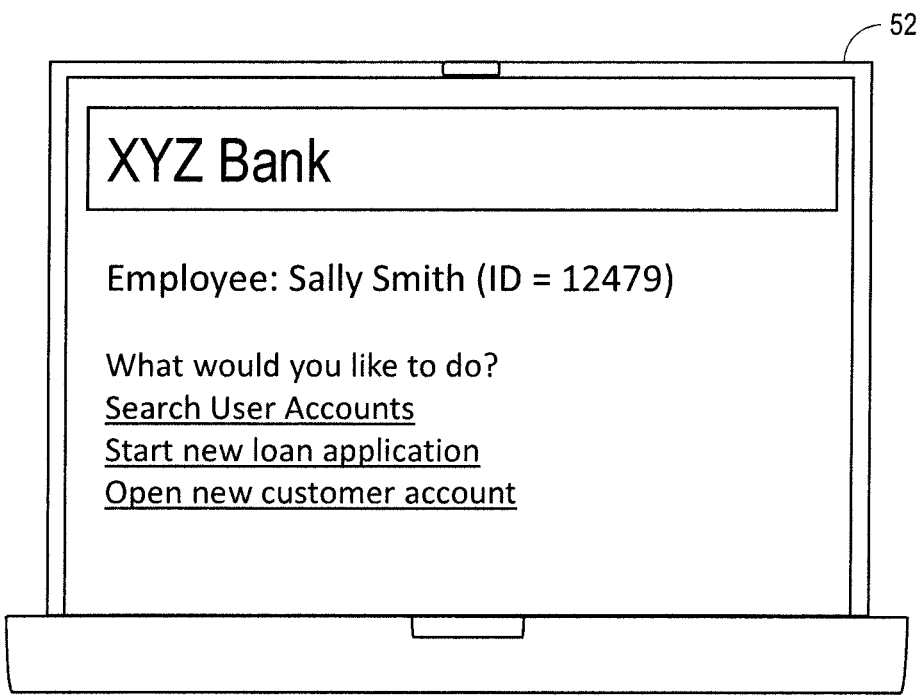

One example of different sets of capabilities for a SaaS application is shown in FIGS. 7 and 8. In the example of FIG. 7, upon authentication of a client device 52 (a laptop in the illustrated example), the server 31 detects that the personal persona of the user (Sally Smith), who is both a client and employee of XYZ Bank, is active. As a result, when Sally accesses the SaaS app for XYZ Bank, the SaaS app is displayed with the respective set of capabilities enabled for the personal persona. More particularly, Sally's personal account information is displayed, including a summary of her various accounts, and options to perform certain actions or operations which are allowed pursuant to the DLP policy associated with her account, namely that she can make deposits to her own accounts, view statements for her own accounts, or transfer funds between her own accounts. None of these capabilities would be enabled if Sally's enterprise persona was active.

On the other hand, in the example of FIG. 8, the context associated with Sally's authentication indicates that her enterprise persona is active. As such, the XYZ Bank SaaS app is provided at the client device 52 with the corresponding capability set for the enterprise persona. More particularly, Sally is provided with options to search bank customer accounts, start a new loan application, and open a new customer account, all capabilities that Sally would not have access to if her personal persona was active.

Various types of capabilities may be enabled in different implementations. For example, one set of capabilities (e.g., for the enterprise persona) may allow for recording or downloading of SaaS application sessions or data accessed during a session, while another set of capabilities (e.g., for the personal persona) may not, or vice versa. As noted above, the different capability sets may also correspond to different DLP access levels. For example, when the personal persona is active, the user may have less privileges within the SaaS application, but a less stringent DLP policy applied, and vice-versa for the enterprise persona. Since the server 31 has control of how the SaaS application is presented to the client device 32 in a UEM (or EMM, etc.) managed environment, it may advantageously block or disable certain features that are not authorized for the active persona. So, even within the same SaaS application, the server 31 may detect the different capabilities and block those that are not applicable for the active persona.

Moreover, the UEM server 31 may provide access to the SaaS application through an embedded or hosted browser, which allows for selectively enabling the different capability sets in real time. Generally speaking, an embedded browser is a browser embedded within a native application or agent. For example, Citrix Receiver and Citrix Workspace App are programs that are installed on client devices and provide an embedded browser. In some cases, the local and embedded browsers may be managed browsers which provide access to the Internet and/or enterprise resources in accordance with certain rules and permission (DLP) levels. For example, Citrix XenMobile is software that provides MDM and MAM capabilities, including micro-VPN technology allowing VPN access on a per-application basis. A hosted browser is run remotely on a cloud or network server, such as in a virtual computing session, and displayed locally at the client computing device 32. For example, such hosted browsers are provided through the Citrix Secure Browser Service.

Figure 5:
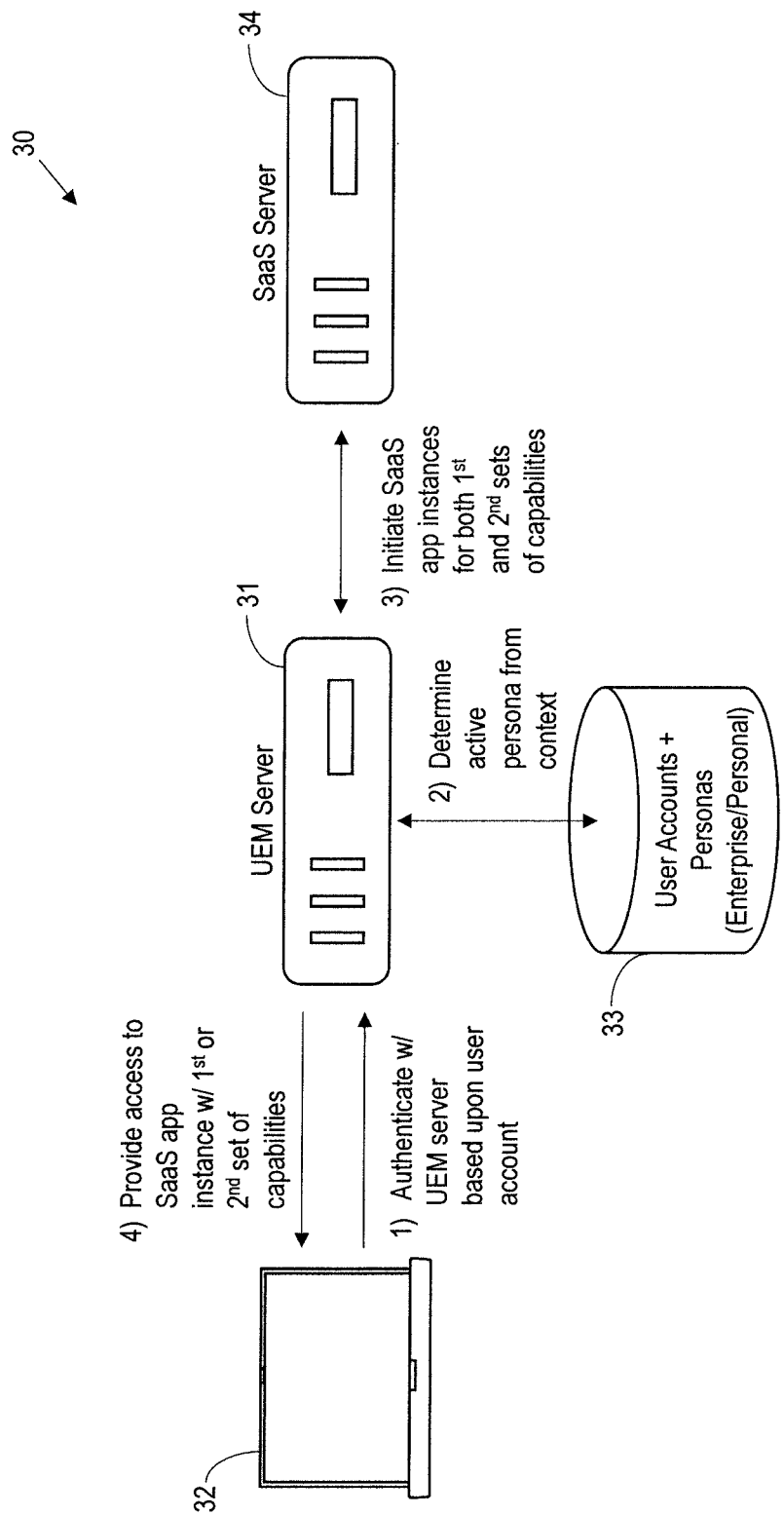
FIG. 5 is a schematic block diagram illustrating another example configuration of the system of FIG. 3.
Figure 6:
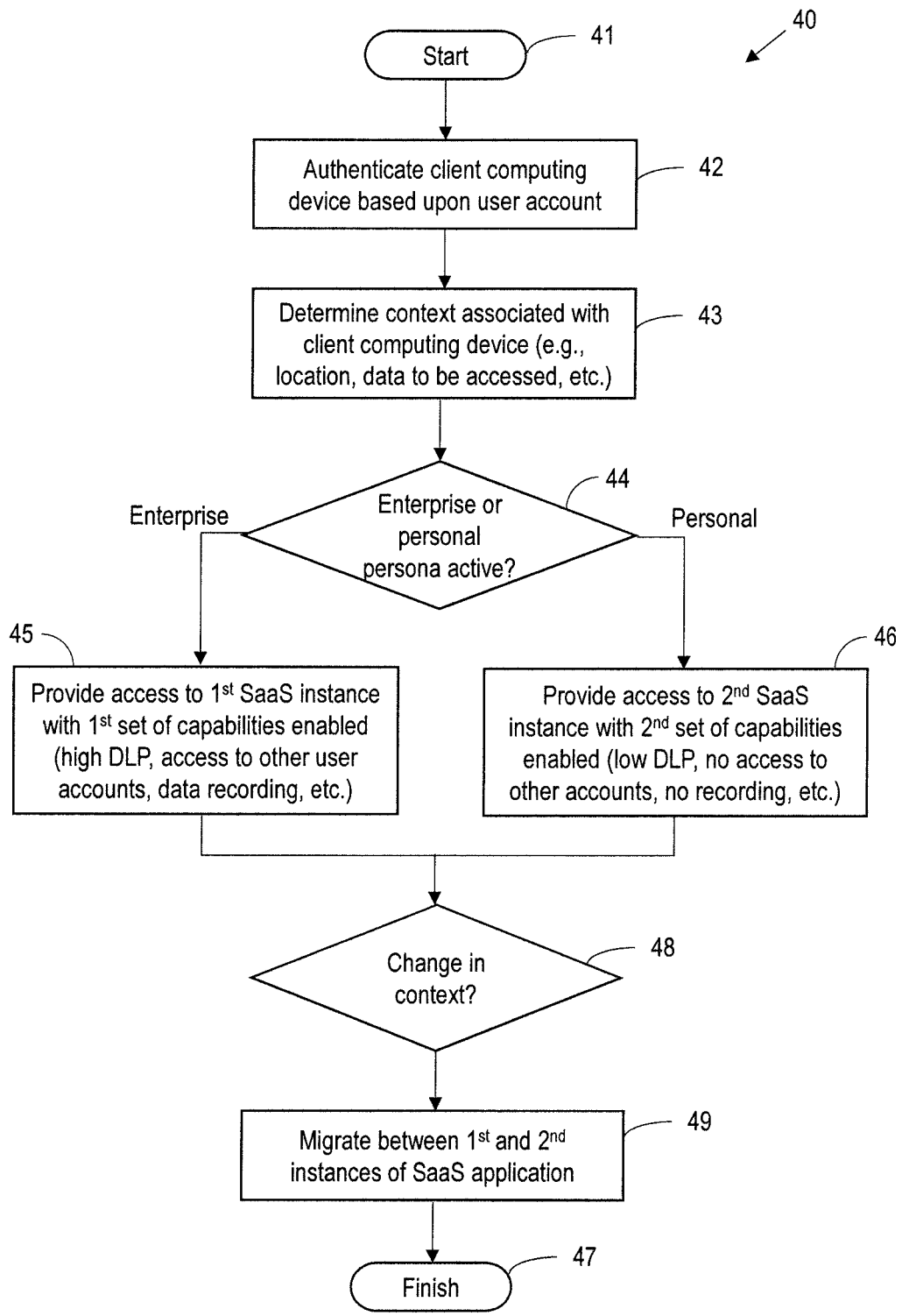
FIG. 6 is a flow diagram illustrating further method aspects of the systems of FIG. 3 or 5.

Turning now to FIGS. 5 and 6, in accordance with another example implementation the server 31 may provide access to a first instance of the SaaS application with the first set of capabilities enabled for the enterprise persona, at Block 45, and provide access to a second instance of the SaaS application with the second set of capabilities enabled for the private persona, at Block 46. In this example embodiment, the steps illustrated at Blocks 41-44 are similar to those described above with reference to FIG. 4, and accordingly need not be discussed further here. Each instance of the SaaS app is configured with the different respective capabilities for the different user personas enabled, as discussed further above (e.g., high/low DLP, access to accounts (or not), data recording (or not), etc.). In the illustrated example, both instances are initiated upon authentication of the client device 32 and run while the client device remains authenticated, even though only one of the instances is available to the user at a time (i.e., the one associated with the active persona). However, in some embodiments only the instance associated with the active persona may be running at a given time, if desired.

One advantage of having both instances of the SaaS app running at the same time is that this allows for relatively fast switching between the instances based upon a change in context associated with the client device 32. That is, the server 31 may be configured to migrate between the first and second instances of the SaaS application, even with the client computing device remaining authenticated (i.e., without logging out from the server), at Blocks 48-49. Thus, for example, if the persona context was based upon the location of the client device 31 inside or outside of a bank, the server 31 may switch the active persona from the enterprise persona to the personal persona immediately upon determining that an employee has left the bank, and vice-versa upon entering the bank. In this regard, the SaaS application is unaware of the context change. Instead, it is the server 31 that keeps track of this and makes the switch between application instances as appropriate. Furthermore, having different application instances allows them to be seen by different DLP platforms or configured at different DLP levels. This may also advantageously accommodate different scenarios where micro-VPN access is available or not, for example.

Further details regarding session state migration may be found in co-pending application Ser. No. 15/971,157 filed May 4, 2018 and filed concurrently herewith, both of which are assigned to the present Applicant and hereby incorporated herein in their entireties by reference.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing system comprising:
   at least one client computing device; and
   a server configured to
     log the at least one client computing device into a user account, the user account having an enterprise persona and a private persona associated therewith, and
     while the at least one client computing device is logged into the user account,
       determine whether the enterprise persona or the private persona is active based upon a context associated with the at least one client computing device,
       when the enterprise persona is active, provide the at least one client computing device with access to a Software as a Service (SaaS) application with a first set of capabilities enabled, and
       when the private persona is active, provide the at least one client computing device with access to the SaaS application with a second set of capabilities enabled that is different than the first set of capabilities;
   wherein the first set of capabilities includes access to data from other user accounts, and the second set of capabilities includes access only to data from the user's respective account.

2. The computing system of claim 1 wherein the server determines whether the enterprise persona or the private persona is active based upon a location of the client computing device.

3. The computing system of claim 1 wherein the server determines whether the enterprise persona or the private persona is active based upon a type of data to be accessed by the at least one client computing device.

4. The computing system of claim 1 wherein the first and second sets of capabilities are associated with different respective data loss prevention (DLP) access levels.

5. The computing system of claim 1 wherein the server provides access to a first instance of the SaaS application with a first set of capabilities enabled for the enterprise persona, and provides access to a second instance of the SaaS application with the second set of capabilities enabled for the private persona.

6. The computing system of claim 5 wherein the server is further configured to migrate between the first and second instances of the SaaS application while the at least one client computing device remains authenticated based upon a change in the context.

7. The computing system of claim 1 wherein the first set of capabilities includes data recording, and the second set of capabilities does not include data recording.

8. A method for using a server comprising:
   logging at least one client computing device into a user account, the user account having an enterprise persona and a private persona associated therewith; and
   while the at least one client computing device is logged into the user account,
     determining whether the enterprise persona or the private persona is active based upon a context associated with the at least one client computing device,
     when the enterprise persona is active, providing the at least one client computing device with access to a Software as a Service (SaaS) application with a first set of capabilities enabled, and
     when the private persona is active, providing the at least one client computing device with access to the SaaS application with a second set of capabilities enabled that is different than the first set of capabilities;
   wherein the first set of capabilities includes access to data from other user accounts, and the second set of capabilities includes access only to data from the user's respective account.

9. The method of claim 8 wherein the first and second sets of capabilities are associated with different respective data loss prevention (DLP) access levels.

10. The method of claim 8 wherein determining comprises determining whether the enterprise persona or the private persona is active based upon a location of the client computing device.

11. The method of claim 8 wherein determining comprises determining whether the enterprise persona or the private persona is active based upon a type of data to be accessed by the at least one client computing device.

12. The method of claim 8 wherein the first set of capabilities includes data recording, and the second set of capabilities does not include data recording.

13. The method of claim 8 wherein providing access to the SaaS application further comprises providing access to a first instance of the SaaS application with a first set of capabilities enabled for the enterprise persona, and providing access to a second instance of the SaaS application with the second set of capabilities enabled for the private persona.

14. The method of claim 13 further comprising migrating between the first and second instances of the SaaS application while the at least one client computing device remains authenticated based upon a change in the context.

15. A non-transitory computer-readable medium having computer-executable instructions for causing a server to perform steps comprising:
   logging at least one client computing device into a user account, the user account having an enterprise persona and a private persona associated therewith; and
   while the at least one client computing device is logged into the user account,
      determining whether the enterprise persona or the private persona is active based upon a context associated with the at least one client computing device,
      when the enterprise persona is active, providing the at least one client computing device with access to a Software as a Service (SaaS) application with a first set of capabilities enabled, and
      when the private persona is active, providing the at least one client computing device with access to the SaaS application with a second set of capabilities enabled that is different than the first set of capabilities;
   wherein the first set of capabilities includes access to data from other user accounts, and the second set of capabilities includes access only to data from the user's respective account.

16. The non-transitory computer-readable medium of claim 15 wherein the first and second set of capabilities are associated with different respective data loss prevention (DLP) access levels.

17. The non-transitory computer-readable medium of claim 15 wherein determining comprises determining whether the enterprise persona or the private persona is active based upon a location of the client computing device.

* * * * *